July 16, 1968 H. B. CARROLL 3,392,611
FEED DRIVE FOR ENGINE LATHE
Filed March 21, 1966
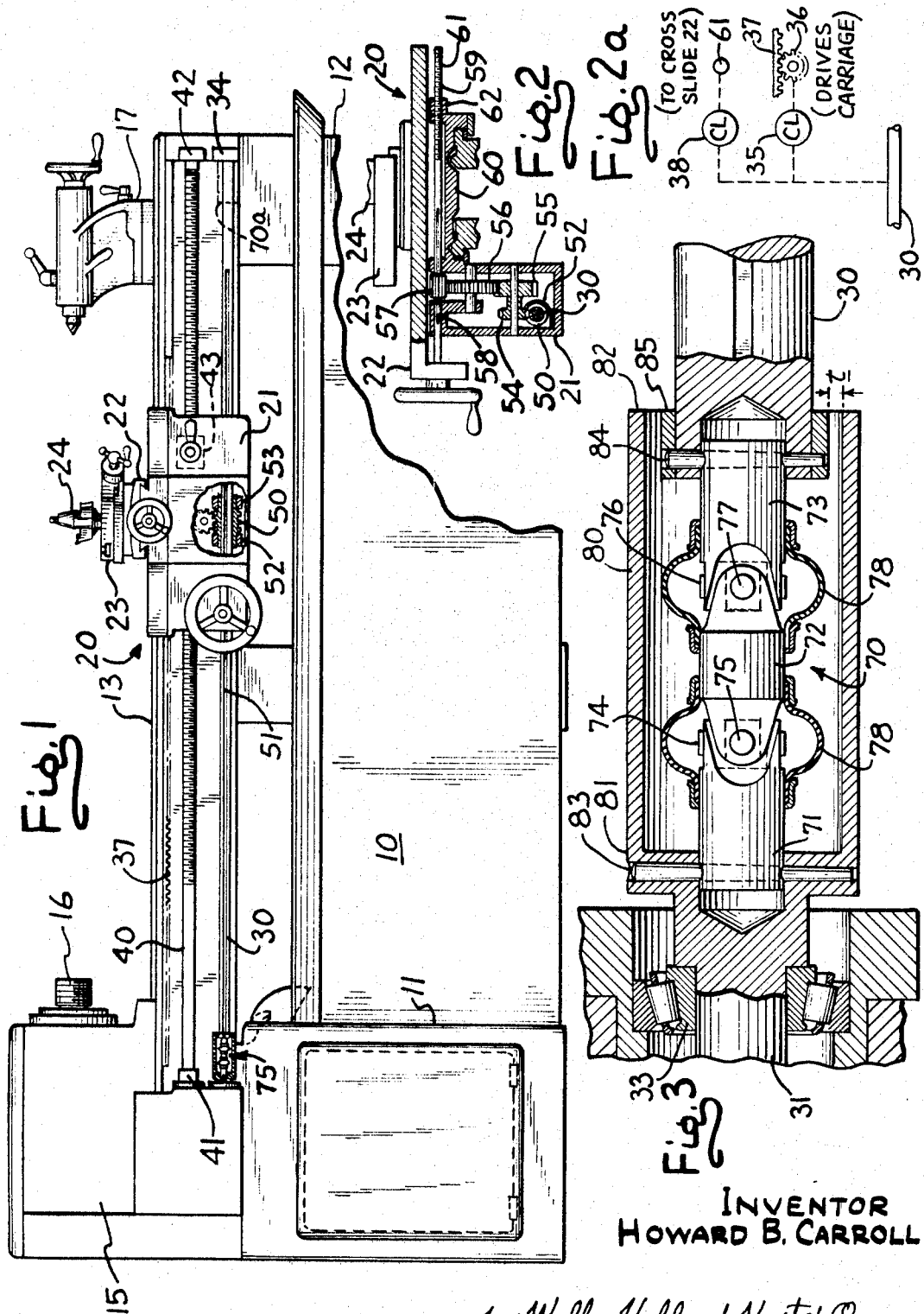
INVENTOR
HOWARD B. CARROLL
by: Wolfe, Hubbard, Voit & Osann
ATTYS.

United States Patent Office 3,392,611
Patented July 16, 1968

3,392,611
FEED DRIVE FOR ENGINE LATHE
Howard B. Carroll, Winnetka, Ill., assignor to Sheldon Machine Co., Inc., Chicago, Ill., a corporation of Illinois
Filed Mar. 21, 1966, Ser. No. 535,996
1 Claim. (Cl. 82—27)

ABSTRACT OF THE DISCLOSURE

A feed drive arrangement for an engine lathe in which a splined feed rod drives a gear which is closely fitted in bearings in the apron of the lathe carriage and in which a double universal joint is provided at at least one end of the feed rod to accommodate lateral motion due to bowing of the feed rod as the latter rotates, thereby to prevent the bowed rod from applying cyclical lateral pressure against the apron affecting the finish on the workpiece.

---

In a conventional engine lathe both the carriage, which moves along the bed and the cross slide which moves inwardly and outwardly on the carriage are powered by gears in the carriage apron. Power is fed to the gears by a longitudinally extending feed rod and suitable clutches in the apron enable selective driving of carriage and cross slide. It has been noted that when taking a finish cut the surface of the workpiece is not as uniform as one might expect considering the close tolerances adhered to by most lathe manufacturers.

Accordingly it is an object of the invention to provide a lathe having means for producing a more perfect finish on a workpiece than is usually possible in lathes having a rotating feed rod. It is a more specific object to eliminate any cyclical or pulsing movement of the cutting tool resulting from imperfections in the feed rod and the bearings in which it is mounted. Other objects and advantages of the invention will become apparent upon reading the attached detailed description and upon reference to the drawings in which:

FIGURE 1 is an elevation, considerably simplified, of a typical engine lathe employing the features of the present invention with the apron of the carriage being partially broken away to show the feed worm.

FIG. 2 is a sectional view looking along the line 2—2 in FIG. 1, also considerably simplified.

FIG. 2a is a schematic diagram showing clutches in the feed and traverse drive trains.

FIG. 3 is a fragmentary view, in axial section, showing the coupling at the driving end of the feed rod.

While the invention has been described in connection with a preferred embodiment, it will be understood that there is no intention to be limited to the particular embodiment shown. On the contrary, it is intended to cover the various alternative and equivalent constructions included within the spirit and scope of the appended claim.

Turning now to the drawings, there is shown an engine lathe 10 having left and right-hand pedestals 11, 12 and a horizontal bed 13. At one end of the bed is a headstock 15 having a spindle 16 for rotating the workpiece. The workpiece is engaged at its opposite end by a tailstock 17.

Mounted on suitable ways for traversing movement endwise of the bed is a carriage 20 (see also FIG. 2) having an apron 21 and mounting a cross slide 22 which is movable in the feed direction, inwardly and outwardly of the carriage. The cross slide carries a compound 23 supporting a tool holder 24.

As is conventional in engine lathe construction means are provided for selectively powering the carriage and cross slide respectively for movement of the tool in traverse and feed. Since such selective driving is well known in the art, it will suffice to show the drive train schematically in FIG. 2a. Briefly stated, a feed rod 30 is provided which extends horizontally through the apron 21 and which is coupled at its lefthand end to a drive shaft 31 in a gear box 32. The drive shaft 31 is supported in a bearing 33 and, at its remote end, the feed rod is supported in a bearing 34. For imparting traversing movement, the feed rod 30 is effectively coupled through a suitable clutch 35 to a pinion 36 in the apron, the pinion engaging a rack 37 secured adjacent the ways. Alternatively, the feed rod 30 is coupled to the cross slide 22 by a clutch 38. For the sake of simplicity, the clutch has been omitted from FIG. 2 which shows the mechanical connection between the feed rod and the cross slide.

For completeness it may be mentioned that separate provision is made for traversing the carriage for thread cutting or other special purposes. Thus a lead screw 40 is provided adjacent the feed rod 30 having a drive coupling 41 connected to suitable gears in the gear box 32 and having a bearing 42 for supporting the screw at its opposite end. To engage the thread on the screw 40, a split nut indicated diagrammatically at 43 is provided on the carriage with a suitable manual control for throwing the nut into engagement.

Referring now more specifically to the means for transferring movement of the feed rod 30 to the cross slide, the feed rod has telescoped over it a feed worm 50 keyed to a longitudinal spline 51 formed in the rod. The ends of the worm are cylindrically extended to form integral bushings journalled in bearings 52, 53 which are structurally integral with the apron 21. The worm 50 engages a worm wheel 54 close-coupled to a gear 55. The latter meshes with an idle 56 which in turn meshes with a pinion 57 which is keyed, by a spline 58, to a feed shaft 59. The apron is supported by a carriage slide 60.

For converting rotary motion of the screw into feed movement of the cross slide, the shaft is threaded as indicated at 61, engaging a nut 62 secured to the carriage slide 60. Since the shaft 59 is captively journalled in the cross slide, it will be apparent that rotation of the shaft 59 reacting against the nut 62 on the carriage, will cause the cross slide to be moved in one direction or the other along the feed axis, with the endwise movement of the shaft being accommodated by telescoping movement of the pinion 57 on the spline.

In accordance with the present invention, when employing a feed rod 30 which is held captive in the gear box carriage apron, an end bearing a double universal joint is interposed at at least one end of the feed rod for accommodation of lateral movement resulting from bowing imperfections in the feed rod. Further in accordance with the invention means are provided at the double universal joint for severely limiting the degree of radial throw to preclude the possibility of whipping action when the feed rod is rotated at high speed. By reference to the feed rod as "captive" in the apron is meant that there is absence of any lateral play between the feed rod and the apron. In the present instance lateral play is precluded by the fact that the feed rod is snugly telescoped within the worm 50 which in turn is closely fitted in bearings such as indicated at 52, 53.

Thus, referring to the drawings and particularly to FIG. 3, there is shown a double universal joint 70 of the type having an input element 71, an intermediate element 72, and an output element 73. The elements 71, 72 are coupled together by hinge pins 74, 75 while the elements 72, 73 are coupled together by hinge pins 76, 77. To contain the necessary lubricant and to shield against entry of dirt, each portion of the universal joint is enclosed by a rubber boot 78.

In order to limit the lateral throw of the universal joint 70, it is confined within a cylindrical housing 80 which has a base portion 81 and a lip portion 82 and which extends bridgingly over the joint. For the sake of simplicity, the base portion 81 has been shown as integral with the drive coupling 41 which projects from the gear box. A pin 83 provides connection to the input element 71, while the output element 73 is connected by a pin 84 to the feed rod. A collar 85 opposite the lip 82 is dimensioned to limit the throw of the rod to an amount indicated at $t$.

It might be thought that in a carefully constructed engine lathe the amount of bowing of the feed rod would be so small as to have negligible effect. It might be thought, also, that since the carriage assembly is heavily constructed and solidly seated on the longitudinal ways, precluding any possibility of rocking movement, there would be no possibility of transmitting variations in lateral force between the feed rod and the apron to the tool in the tool holder. Indeed, the pulsing imperfections which have shown up on a workpiece in the making of a finish cut have tended to mystify lathe operators and engineers. However, my investigations have shown that the bowing imperfection in the feed rod of a regular production lathe, falling within a range generally thought to be tolerable in lathe practice, is, nevertheless, capable of producing bodily movement of the apron, synchronized with rotation of the feed rod, in an amount which may vary between twenty millionths of an inch to two ten-thousandths of an inch. My observations have shown that, notwithstanding the small amplitude of movement and the heavy construction and firm seating of the carriage, a pronounced pulsing effect is transmitted to the tip of the cutting tool causing cyclical imperfections during a finish cut. Indeed, I have found that because of the relatively large lateral spacing between the feed rod and the ways which support the carriage, the pulsing effect at the lower end of the apron, may, due to leverage, be multiplied at the point of contact between the tool and the workpiece. By floatingly mounting the end of the feed rod through the double universal joint 70, any eccentric throw or offset of the feed rod which occurs due to bowing will be accommodated at the universal joint, resulting in complete freedom from pulsing movement at the apron of the carriage. Thus, it is found that by making a relatively simple change in the mounting of the feed rod it has been possible to achieve a degree of finish not heretofore obtainable in a conventional engine lathe.

It is preferred to mount the double universal joint at the driving end of the feed rod, but it is also contemplated that the double universal joint may be mounted at the remote end, i.e., between the right-hand end of the feed rod and the bearing 34 as indicated by the dot-dash outline 70a. In either event the apron is not subjected to the lateral throw.

When operating the feed rod at high rates of speed, say, upwards of 200 r.p.m., and particularly when the carriage is at the remote end of the bed, the throw or offset due to bowing may set up an unstable condition in which lateral whipping may occur at the end of the rod. If this condition should develop, it is kept within safe limits by the bottoming of the collar 85 upon the lip portion 82 of the U-joint housing 80.

The term "double universal joint" as employed herein and in the claims which follow shall be understood to mean a universal joint with double articulation to permit lateral displacement between the input and output axes or equivalent device for permitting limited lateral freedom at at least one end of the feed rod. In a rudimentary form of the invention the rod may be driven by a length of resilient material, for example, rubber hose, interposed between the drive coupling 31 and the presented or driven end of the feed rod. Also, while the term "feed rod" has been employed for convenience in referring to the longitudinally extending rod which transmits feed movement to the carriage, and while this will normally be a splined rod, the term is intended to apply to any rod performing an equivalent function, for example, the threaded feed rod employed in some designs of engine lathes. Moreover, the term "feed" shall be understood to include tool movement in a general sense and is not limited to movement in a particular direction.

I claim as my invention:

1. In an engine lathe the combination comprising a bed having a head stock including a gear box and feed coupling, a carriage having an apron and mounted for traversing movement along the bed, a cross slide on the carriage mounted for feeding movement, a splined feed rod extending along the bed through the lower portion of the apron and having a first end coupled to the feed coupling and a second end at the end of the bed, a feed transmitting connection including a spline-type gear telescoped over the feed rod for rotation with the feed rod for effecting feeding movement of the cross slide as the feed rod is rotated, bearings in said apron for journaling the splined gear and closely fitted to the latter, and a double universal joint interposed at at least one end of the feed rod having means for accommodating lateral motion due to bowing of the feed rod as the latter rotates thereby to prevent the bowed rod from applying cyclical lateral pressure against the apron affecting the finish on the workpiece.

References Cited

UNITED STATES PATENTS

| | | | |
|---|---|---|---|
| 1,330,881 | 2/1920 | Lineham | 82—27 |
| 2,325,733 | 8/1943 | Bickel | 82—22 |

LEONIDAS VLACHOS, *Primary Examiner.*